United States Patent [19]

Green

[11] 4,127,928
[45] Dec. 5, 1978

[54] MEASURING METER POINTER ASSEMBLY

[75] Inventor: Talmage O. Green, Schaumburg, Ill.

[73] Assignee: Snap-on Tools Corporation, Kenosha, Wis.

[21] Appl. No.: 769,175

[22] Filed: Feb. 16, 1977

Related U.S. Application Data

[63] Continuation of Ser. No. 541,151, Jan. 15, 1975, abandoned.

[51] Int. Cl.$^2$ .............................................. B23P 19/02
[52] U.S. Cl. .................................. 29/453; 116/136.5; 58/126 D
[58] Field of Search ................. 116/136.5, DIG. 6; 58/126 D; 324/154 PB; 29/453; 403/243, 365

[56] References Cited

U.S. PATENT DOCUMENTS

| | | | |
|---|---|---|---|
| 240,380 | 4/1881 | Buck | 116/136.5 X |
| 267,824 | 11/1882 | Bell | 58/126 D |
| 1,192,811 | 7/1916 | Borrensen | 58/126 D |
| 1,801,778 | 4/1931 | MacGahan | 116/136.5 |
| 1,988,595 | 1/1935 | Hiss | 29/453 X |
| 2,255,003 | 9/1941 | Rodanet | 116/136.5 |
| 2,478,307 | 8/1949 | Overacker | 116/136.5 |
| 2,702,087 | 2/1955 | Beier | 29/453 |
| 2,761,415 | 9/1956 | Waite | 116/136.5 |
| 3,117,611 | 1/1964 | Matthews | 29/453 |
| 3,342,273 | 9/1967 | Crane | 403/365 |
| 3,738,152 | 6/1973 | Green | 73/1 R |
| 3,855,787 | 12/1974 | Assmus | 58/126 D |

Primary Examiner—Daniel M. Yasich

[57] ABSTRACT

Improved dial pointers and mounts therefor to facilitate the method involving a press-fitted clutching and frictional assembly with non-slip permanent engagement there between for use with calibrated measuring meters as an adjunct to torque measuring wrenches and other measuring devices.

This is preferably, though not essentially, accomplished with slitted dial pointer bodies in the region of and contiguous with the mounting hole therein for the yieldable reception of tapered hub body mounts that are peripherally grooved for press-fitted clutching and frictional engagement there between to effect their permanently fixed assembly, and in turn slightly tapering the axial hole of the mounts for press-fitted connection with the driven meter pins to more readily and less expensively assemble these components of relatively small calibrated measuring meters.

3 Claims, 5 Drawing Figures

MEASURING METER POINTER ASSEMBLY

This is a continuation of my application Ser. No. 541,151, filed Jan. 15, 1975 for the same invention.

This invention relates to improved dial pointers and mounts therefor to more effectively, readily and less expensively assemble and integrally articulate these components with measuring meters for torque measuring and other comparatively small portable measuring devices.

It contemplates more especially the provision of an improved method of assembling calibrated dial pointers with mounting holes and preferably though not essentially having slitted bodies contiguous therewith to render such yieldable for press-fitted fixed assembly of tapered axial body mounts therewith to effect their permanent clutching engagement into integral assembled units for connection with the driven pins or shafts of calibrated measuring instruments.

The dial pointers are of the type disclosed and claimed in U.S. Letters Pat. No. 3,738,152 issued June 12, 1973; however, these have been improved to render them sufficiently yieldable to receive tapered mounts press-fitted in clutching engagement therewith to eliminate costly small part fabrication and assembly operations of a precision character.

With the teachings of the present invention, small part fabrication is reduced to a minimum and assembly of the pointers and their axial mounts are effected by one-step press-fitted deformable clutching assembly operations which are fast, inexpensive, effective and eliminate all swaging or assembly turning operations that involve more handling with less dependability in maintaining the assembly thereof; therefore, improved results are attained with fewer parts and without any appreciable manual operations in permanently assembling the principal components, namely, the pointers and axial mounts therefor.

One object of the present invention is to provide an improved method of permanently connecting small lightweight pointers and mounts to facilitate the one-step press-fitted ready assembly of separate small parts into an integral unit.

Another object is to provide improved pointers having yieldable mounting holes for clutching engagement with axial bushings that is press-fitted therein to serve as a bearing in relation to a measuring meter driven pin to function relative to a calibrated dial.

Still another object is to provide improved pointers with yieldable axial bearing clutching holes to frictionally receive and effectively engage frusto-conical meter driving mounts or bearings for simple press-fitted assembly thereof into an integral unit.

A further object is to provide simple slitted pointers in the region of their bearing or mount receiving holes for press-fitted frictional permanent engagement therebetween to function as an integral unit.

A still further object is to provide slitted pointer bodies and bearing receiving holes contiguous therewith for yieldable frictional one-step press-fitted permanent assembly with tapered bearing mounts therewith.

An additional object is to provide more simple and less expensive frictional clutching pointers and bearing mounts to effectively and less expensively assemble these components into an integral unit for use with measuring meters and the like.

Other objects and advantages will appear from the following description of an illustrated embodiment of the present invention.

In the drawing:

FIG. 5 is an enlarged side view in elevation of a calibrated measuring meter which is actuated, in this instance, by a translating member comprising part of a torque wrench or the like.

Figure 4:
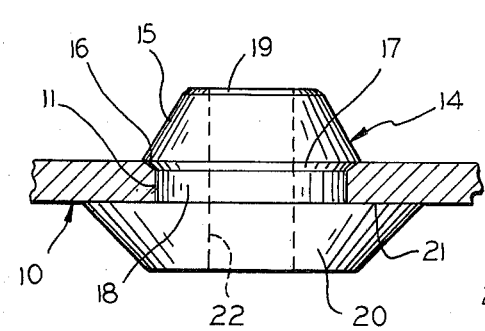
FIG. 4 is a greatly enlarged view in elevation of a tapered frusto-conical bearing mount with the fragmentary pointer body shown in section to illustrate the effective gripping angular edges therebetween responsive to the press-fitted assembly thereof.

The structure selected for illustration exemplifies a method of articulating pointers with bearing mounts to function as an integral unit in relation with a calibrated dial for measuring instruments. It comprises a double headed measuring meter pointer 10 preferably of thin flexible material fully described in my U.S. Letters Pat. No. 3,738,152. To enable more effective and much faster assembly thereof with a bearing mount of the type to be hereinafter described, a central bearing receiving hole 11 is provided contiguous with an elongated slot 12–13 for sufficient length in order to render the hole 11 yieldable which otherwise presents a solid peripheral body therefor. The flexibility should be enough to yield to a degree to receive and tightly clutch the bearing mount 14 (FIG. 4). The bearing mount 14 with its frusto-conical or peripherally tapered upper region 15 is sized and shaped for press-fitted engagement with and into the hole 11 just beyond its greatest diameter 16 that peripherally tapers down at an angle as at 17 to present a very sharp gripping peripheral edge 16.

It should be noted that the peripheral tapered edge 17 is somewhat larger than the diameter of the pointer hole 11 to cause the latter to slightly deform or stretch in its engagement with the sharp peripheral bearing mount edge 16 to effectively clutch the pointer 10 against any possible slippage. To this end, the bearing mount 14 has a straight cylindrical neck 18 which is the same diameter as the pointer hole 11 but slightly less in height than the thickness of the pointer 10. This causes the pointer 10 in the region of its hole 11 to ride up the slight tapered peripheral edge 17 to insure that there will be some slight deformation of the pointer 10 in the region of the hole 11 to tightly embrace the tapered peripheral bearing mount edge 17 and permanently engage with maximum frictional clutching bite the sharp peripheral corner 16 to insure the effective and rigid assembly thereof into an integral one-piece unit responsive to a rapid one-step press-fitted stamping operation thereon for continuous production-line articulation.

It should be noted that the top peripheral edge 19 of the bearing mount 14 is chamfered to easily admit its limited entry into the hole 11 of the pointer 10. The bearing mount peripheral neck 18 has an enlarged lower periferally flanged base 20 to define a flat support surface 21 for the pointer 10. This lower flanged base 20 of the bearing mount 14 may be of any exterior shape, but for symmetry and to lessen the weight and material mass, it advantageously should be reversely frusto-conical relative to the upper bearing mount region 14 and preferably though not essentially somewhat larger in size.

Figure 5:
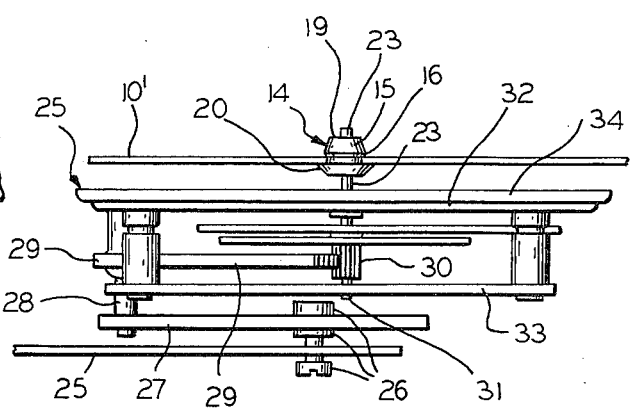

The bearing mount 14–20 is provided with an axial cylindrical bore 22 therethrough, and this bore 22 receives a driven pointer mounting pin 23 (FIG. 5). The pin 23 is slightly tapered so that the pointer bearing 14 with its bore 22 can be tightly press-fitted thereon to maintain the pointer 10 or 10' responsive to the rotation of the driven pin 23 that constitutes part of the small calibrated measuring meter 25 (FIG. 5) of any suitable or standard design and construction. The latter is, in this instance, actuated by a translation member 25' and these elements comprise part of a suitable torque wrench (not shown) and which is fully described in U.S. Letters Pat. Nos. 3,599,483 and 3,633,418.

Briefly described, the translation member 25' has a swivel connector which includes an adjustment screw 26 for attachment along a slotted arm 27. The arm 27 is attached at its end to pivot pin 28 which operates a gear sector 29 in mesh with a pinion 30. The pinion 30 is fixed to the lower end 31 of the pointer pin which is journalled in the spaced frame plated 32-33 of the measuring meter 25. The frame plate 32 carries a dial support plate 34 on which is inscribed a calibrated dial (not shown) of the type illustrated in U.S. Letters Pat. No. 3,738,152. The pointer 10 or 10' is carried by the pin 23 in confronting relation to the dial support plate 34 and the calibrated dial thereon to indicate the measurement of torque load applied by the torque wrench; however, it should be observed that the application of the measurement meter 25 may be to any type instrument and its reference to a torque wrench is merely illustrative.

Figure 1:
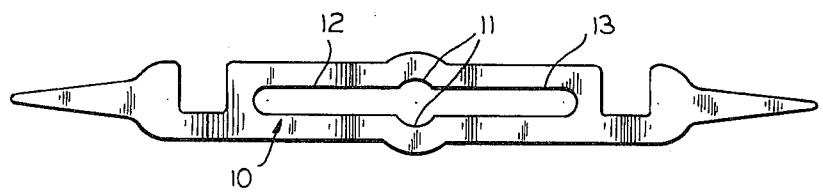
FIG. 1 is a greatly enlarged plan view of a double headed pointer embodying features of the present invention.
Figure 2:
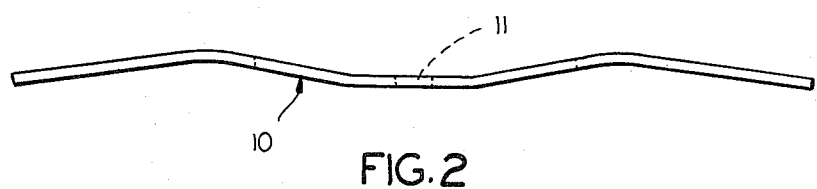
FIG. 2 is an edge view of the pointer shown in FIG. 1; however, the shaped deformation thereof is optional depending upon the dictates of commercial practice.
Figure 3:
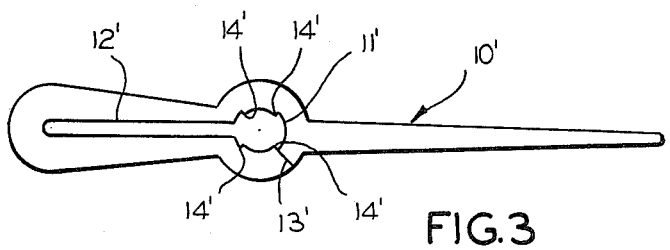
FIG. 3 is an enlarged plan view of a flat single headed pointer showing how much may be rendered yieldable in the region of the mounting hole for clutching engagement with a bearing mount press-fitted thereto for ease in the assembly thereof.

The single pointer 10' (FIG. 3) embodies the same bearing mount hole 11' contiguous with an elongated slot 12' to provide yieldability preferably though not essentially with a radial slit 13' to insure the desired yieldability for press-fitting the bearing mount 14 (FIG. 4) therethrough in the manner described in connection with the double pointer 10 (FIG. 1). To insure greater and more secure engagement with the bearing mount 14, the hole 11' may preferably be serrated to provide sharp gripping teeth 14'; however, this depends upon the dictates of commercial practice. It should be borne in mind that the enlargements shown in FIG. 1 to 4 inclusive are at least four times actual size and, therefore, the parts involved are small and rather sensitive to deformation and assembly. The relative size of the bearing mount bore 22 (FIG. 4) and the tapered pointer carrying pin 23 is such that a firm press-fit will take place when the bearing mount 14 is pressed thereon so that the top of the pin 23 just projects slightly above the top end 19 of the bearing mount 14 (FIG. 5).

This method of articulating the joinder of a small flexible pointer 10—10' with a bearing mount 14 into an integral unit by press-fitting in a contiguous straight-line production operation substantially reducing their unitary assembly cost and results in an improved unit design by decreasing the number of assembly operations and parts. Heretofore, ferrules, retainer discs and swaging or equivalent operations were involved at increased expense.

Various changes may be made in the embodiment of the invention herein specifically described and applied without departing from or sacrificing any of the advantages of the invention or its scope or any features thereof, and nothing herein contained shall be construed as limitations thereon, its concepts or structural embodiment except as defined in the appended claims.

I claim:

1. A method of articulating the joinder of a flat pointer flexible body with a bearing mount of substantially frusto-conical shape which consists in providing a slitted but peripherally solid mounting hole in said flat pointer flexible body of somewhat larger diameter than the smallest diameter of said frusto-conical bearing mount, telescoping said flat pointer flexible body hole partially over said smallest diameter of said frusto-conical bearing mount, there being a peripheral groove in said frusto-conical bearing mount conical body, and then in a one-step stamping operation press-fitting said flat pointer flexible body over the larger diameter of said frusto-conical bearing mount to lodge the flat pointer flexible body in said peripheral groove of the bearing mount intermediate thereof for permanent deformed clutching engagement with said substantially frusto-conical bearing mount responsive to the deformation of the hole in said flat pointer flexible body.

2. A method defined in claim 1 wherein said substantially frusto-conical bearing mount has an annular groove with pointer gripping peripheral edge in the larger diameter thereof to receive said flat pointer flexible body in the region of its mounting hole for the permanently deformed rigid connection therebetween responsive to the displacement of the latter over said bearing mount.

3. A method defined in claim 2 wherein said annular body mount groove has a tapered peripheral edge presenting the sharp biting engagement with said flat pointer flexible body mounting hole to insure the permanently deformed clutching joinder therebetween responsive to the press-fitted displacement of one relative to the other of said elements.

* * * * *